May 27, 1947.     M. MARTY     2,421,279
BODY WITH MOVABLE PARTS
Filed April 24, 1944     3 Sheets-Sheet 1
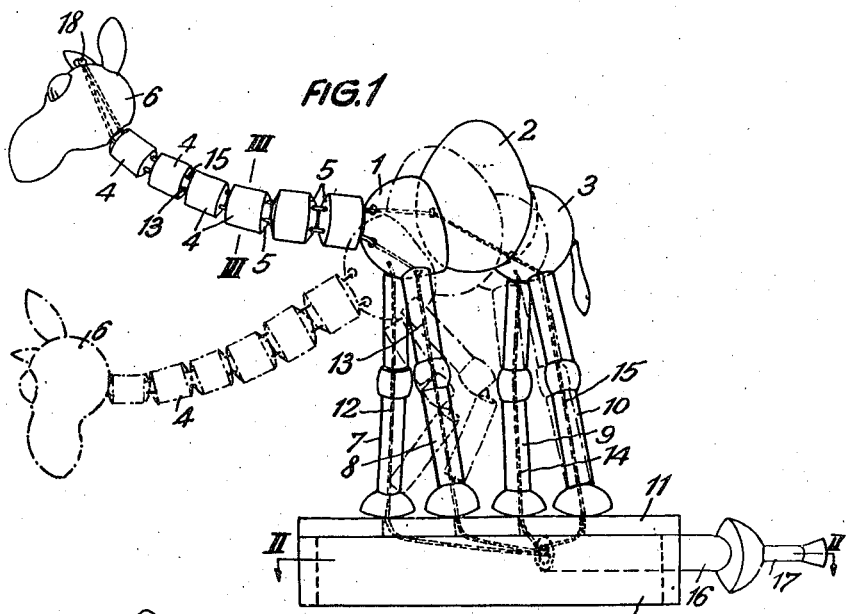
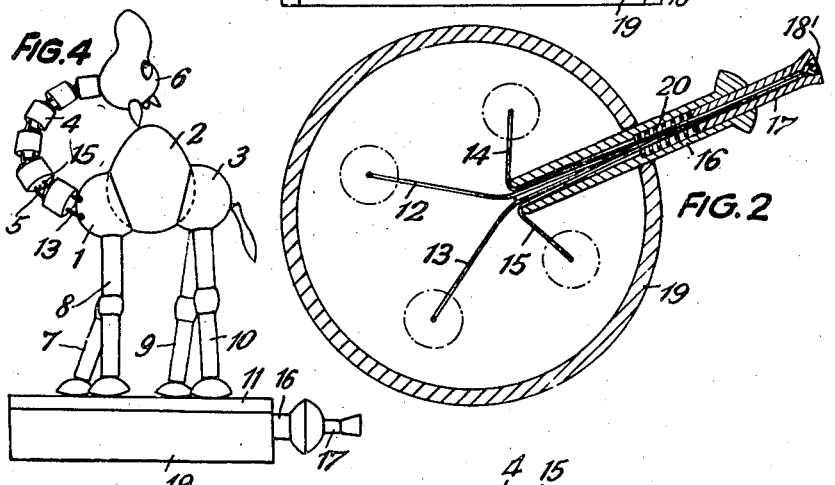
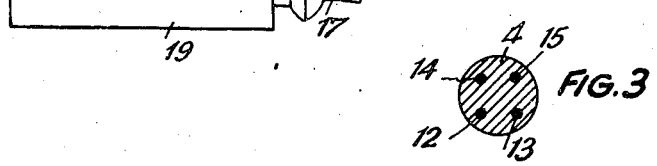
INVENTOR:
Meinrad Marty
by Sommers Young
Attorneys

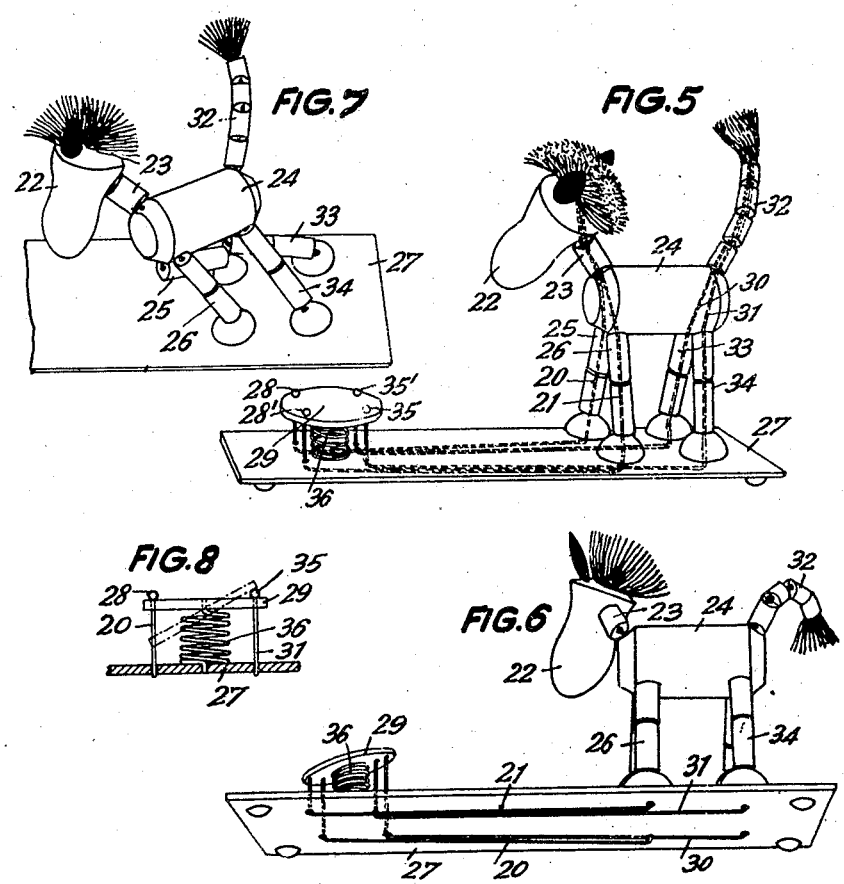

May 27, 1947.  M. MARTY  2,421,279
BODY WITH MOVABLE PARTS
Filed April 24, 1944  3 Sheets-Sheet 3

INVENTOR:
Meinrad Marty
by Sommers & Young
Attorneys

Patented May 27, 1947

2,421,279

UNITED STATES PATENT OFFICE 2,421,279

BODY WITH MOVABLE PARTS

Meinrad Marty, Zurich, Switzerland, assignor to
Emanuel Merian, Basel, Switzerland Application April 24, 1944, Serial No. 532,494
In Switzerland March 25, 1943

11 Claims. (Cl. 46—126)

This invention relates to improvements in bodies having movable parts, such as toys or advertising figures representing human beings or animals, which have heretofore been provided with motion producing mechanisms which were visible from outside (for example the strings of marionette puppets) and enabled carrying out only predetermined movements of parts of a figure that were bound to follow each other in a certain sequence or rhythm and in most cases each part of the figure was movable only separately at that.

The bodies with movable parts according to the present invention differ from the conventional toys in that tension-transmitting members attached to movable parts of the body extend through openings interiorly of the movable parts and pass to a common actuating member which is elastically pressed in a direction to provide tension in the tension-transmitting members and which is situated exteriorly of the body and accessible to the operator so that by displacing the actuating member in different directions with consequent tensioning and relaxing of the tension-transmitting members various movements of individual or of all parts of the body can be obtained.

Embodiments of the invention are illustrated, by way of example only, in the accompanying drawings in which Fig. 1 shows an elevation of a figure of an animal representing a camel;

Fig. 2 depicts actuating means thereof in a sectional view on the line II—II in Fig. 1;

Fig. 3 is a view of a detail on the line III—III in Fig. 1;

Fig. 4 is a view of the camel with its movable parts in different positions;

Fig. 5 is a mock animal figure with the actuating means appearing in a perspective view;

Fig. 6 represents the same animal figure as seen from below in perspective;

Fig. 7 represents again the same animal figure but with its parts in positions for getting up to stand on its feet;

Fig. 8 shows an elevation of the actuating means partly in section;

Figure 9:
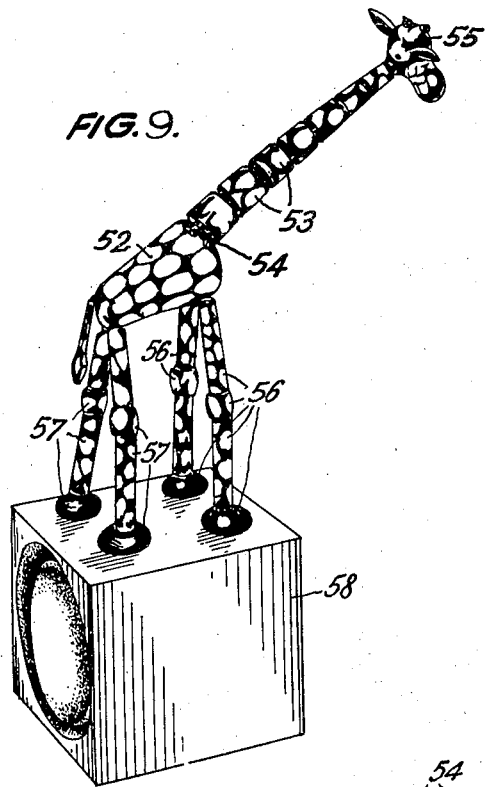
Fig. 9 depicts an animal figure representing a giraffe in a perspective view.

The camel shown in Figs. 1 to 4 as a first embodiment of the invention has a body which is composed of a front part 1, a hump part 2 and a hind part 3. On the front part 1 is arranged the neck which is composed of several roller or beadlike links 4 which adjoin each other by means of bulged end surfaces 5 so as to allow of bending the neck. On the extreme neck link 4 the head 6 is arranged. The front part 1 rests on the front legs 7 and 8 each of which is composed of four parts and the rear part 3 rests on the hind legs 9 and 10. The legs stand on a round base plate 11.

Four connecting members 12, 13, 14 and 15 in the form of tension-transmitting members are secured at one of their ends to the head 6. Thence all the four tension-transmitting members pass through openings or recesses located in spaced relation in the links 4 of the neck in a square arrangement as shown in Fig. 3. The upper tension-transmitting members 14, 15 extend through bores in the body 1, 2, 3 and the hind legs 9 and 10 respectively, whereas the lower tension-transmitting members 12, 13 are threaded through openings in the front part of the body and through the front legs 7 and 8 respectively. All four tension-transmitting members pass through the base plate 11 at points spaced apart in an approximately square formation and are conducted to the central actuating member which has the form of a tube 16 in the bore of which an inner tube 17 is longitudinally displaceably arranged. In the latter tube the other ends of the tension-transmitting members 12 to 15 are secured at 18' (Fig. 2). The tube 16 is mounted below the base 11 in round frames 19 for pivotal and axial displacement. Against the pushing inward of the inner tube 17 (for example by pressure exertion by the thumb) the action of a spring 20 is opposed which spring is anchored to the tube 16 and operates to push back the tube 17 into initial position again on release of pressure exerted on tube 17.

Due to a plurality of tension-transmitting members, consisting in this instance of four members, being arranged in the neck 4 interiorly of the movable links, movements of the neck can be effected in various directions by alternately increasing and diminishing the tension in the tension-transmitting members. If, for example, by pivotally displacing the tube 16 counterclockwise in Fig. 2 the tension-transmitting members 12 and 14 are placed under greater tension while at the same time in the tension-transmitting members 13 and 15 the tension is reduced, the neck turns to the left when viewed from the front of the animal and vice versa if the tube 16 is pivotally displaced clockwise in Fig. 2.

If the tube 16 is pulled slightly outwardly together with the inner tube 17 from the position shown in Fig. 4, the tension-transmitting members 12, 13, which pass through openings or bores in the base 11, and thence through the front legs 7 and 8 and the body part 1 so as to constitute in the adjacent neck the lower two tension-transmitting members which thus have a shortening effect, are placed under increased tension.

At the same time tension-transmitting members 14 and 15, which extend through spaced-apart upper openings in the neck and through the body parts 1, 2 and 3 and the hind legs 9 and 10, and which pass through the base plate through openings which are spaced apart and located rearwardly of the inner end of tube 16 as shown in Fig. 2, are reduced in tension. This is due to the portions of the tension-transmitting members between the inner end of tube 16 and the openings in the base 11 through which said tension-transmitting members pass, being caused to approach the straight line extending between said two openings. The increase of tension in members 12 and 13 together with reduction in tension in members 14 and 15 results in the neck of the animal bending downwardly in a round bow until the head approximately meets the front feet. However if the tube 16 is pushed inwardly together with the tube 17, reversely, the lower two tension-transmitting members 12 and 13 passing through the neck are reduced in tension or slackened while at the same time the upper two tension-transmitting members 14, 15 which then operate to produce shrinkage of the respective neck portion are increased in tension so that the neck bends upward and rearwardly as shown in Fig. 4.

If on the other hand the inner tube 17 which is longitudinally displaceable relative to the outer tube 16 is pushed inward, for example by the thumb at 18', all the tension-transmitting members are reduced in tension to such an extent that the figure begins to collapse inwardly as illustrated in chain-dotted lines in Fig. 1 and finally comes to fall completely. Against the pushing inward of the inner tube 17 the action of the spring 20 is opposed, which spring is anchored in the tube 16, so that this spring operates to push the inner tube 17 outwardly into the initial position again, as shown in Figs. 1 and 2, on relief of pressure.

In order to erect the fallen camel again, it is only necessary to apply tension in the tension-transmitting members 12, 13 and 14, 15 respectively by releasing the pressure on the inner tube 17 which then moves outwardly under the influence of spring 20. By alternately tensioning and releasing the tension members from a common actuating member different movements of varying direction and extent of individual or of all the movable parts of the figure can be obtained.

The second embodiment of the invention as shown in Figs. 5 to 8 represents a mock figure of a horse which is constructed on the same principle as the preceding embodiment. However, one of the ends of the two tension-transmitting members 20, 21 are secured to the head 22 of the horse wherefrom the tension-transmitting members extend through the neck 23, the body part 24 and the front legs 25 and 26 respectively. Thence the tension-transmitting members pass through the base plate 27 on which the animal stands in order to continue upwardly for their other ends to be secured to an actuating plate 29 at 28 or 28', the actuating base plate being arranged above the plate 27. One of the ends of the tension-transmitting members 30, 31 are secured to the end of the tail 32 from where they pass through the links of the tail, the body part 24, the hind legs 33 and 34 respectively and are then fastened at their other ends to the actuating plate 29 at 35 and 35' respectively.

A helical spring 36 urges the actuating plate upwardly, thereby holding the tension-transmitting members tautened when the parts of the horse are in the positions as shown in Fig. 5. By partly depressing the actuating plate 29 into inclined positions, for example into the position shown in Fig. 8, the tension-transmitting members 20, 21 are relieved of tension in consequence whereof the head moves downwardly. In partly depressing the actuating plate in a similar manner other tension members can be relieved so that the head and the tail move either to the right or to the left (Fig. 6). If the whole actuating plate 29 is moved downwardly in parallelism of its parts all the tension transmitting members are relieved of tension and the figure then collapses into an inclined position as shown in Fig. 7. In so doing many droll intermediate positions are obtained.

The actuating plate 29 can be enclosed by a cylindrical or hollow conical ring so as to give the deceptive appearance of a fodder bucket which hides the movements of this plate at the same time. Since the tension-transmitting members are for the most part hidden from view the origin of the movements is left to conjecture.

Figure 10:
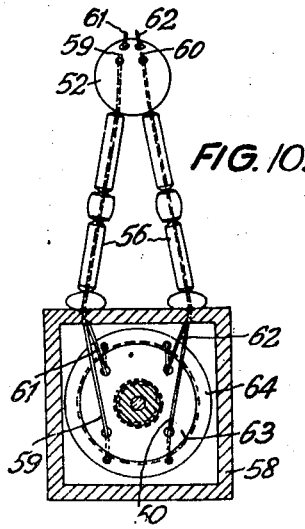
Fig. 10 shows a partial elevation of Fig. 9 sectioned on the line X—X in Fig. 11.
Figure 11:
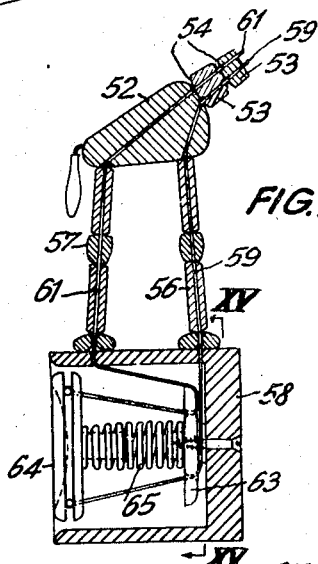
Fig. 11 shows a vertical section in a plane extending at an angle of 90° to the picture plane of Fig. 10.

In Figs. 9 to 11 illustrating a giraffe the body part of the giraffe is designated 52. On the front side of the body part 52 the neck, which is built up of roller or bead-like links 53 having bulged end faces 54 is arranged. The outermost link at the end of the neck is formed as a head 55, and the body parts are sustained by front legs 56 and hind legs 57, each leg being composed of four links. The legs 56, 57 stand on a prismatic base member 58. Four connecting members 59, 60, 61 and 62 are secured at one of their ends to the head and pass through the links 53 of the neck. The members 61 and 62 then pass through the body part and thence through the respective hind legs 57, while the members 59 and 60 similarly pass through the body part and respective front legs 56. All four tension-transmitting members protrude through the wall of the base member 58 and are individually conducted by means of a guide disc 63 toward an actuating plate 64 which is pressed outwardly by a helical spring 65.

The actuating plate 64 is situated in a side surface of the box-like member 58, the upper wall of which serves as the base on which the animal stands. By urging the actuating plate 64 inwardly into inclined positions, individual tension-transmitting members can be relieved of tension by which means the neck can be moved in different directions in a manner similar to that described in connection with the first embodiment. Further, by pushing the actuating plate 64 completely inwardly it is possible to collapse the figure so as to cause it to fall.

In all the embodiments of the invention illustrated any desirable movements of the body which is composed of movable parts can be carried out from a central actuating member. Besides the figures of animals illustrated herein, figures of human beings such as clowns or any other figures

I claim:

1. A body representing a figure comprising, a base, a plurality of articulated abutting elements forming said body, flexible connecting members passing through said elements, spring means normally holding said members under tension and thereby holding said body in a predetermined end position, and actuating means adapted to vary the tension in the individual connecting members to provide for positions of said body different from said end position.

2. A body representing a figure, comprising a base, a plurality of articulated, abutting elements forming said body, flexible connecting members passing through said elements, a tiltable actuating device connected to said connecting members for tightening said members to provide for stiffening said body and for loosening said members to provide for the collapse of some of the elements of the body, and a spring acting on said actuating device normally tending to tighten said connecting members for normally maintaining said body in the erect position.

3. In a body comprising a mock figure representing an animate living being such as a human or an animal, said body comprising a series of movable parts, a base member on which said body stands, tension-transmitting members attached at one of their ends respectively to some of said movable parts, an actuating member protruding from said base member, said tension-transmitting members being connected at their other ends to a part of said actuating member, said actuating member having an outer tubular part and an inner tubular part, means for mounting said outer tubular part for pivotal and axial displacing movements, the inner part being longitudinally displaceably arranged in said outer tubular part and having secured thereto the other terminal ends of said tension-transmitting members, said two tubular parts cooperating to actuate said tension-transmitting members so that by selectively shifting said outer tubular part as afforded by said mounting means, and longitudinally displacing said inner tubular part, said tension-transmitting members are correspondingly tensioned and slackened respectively for causing the individual movable body parts to effect consequent movements in various directions and to different extends relative to other body parts in response to said actuating means.

4. In a toy representing a figure having movable parts, a base on which the figure is mounted, said figure being formed of a plurality of abutting elements, flexible connecting members passing through said elements, a tiltable actuating device connected to said connecting members for tightening said members to provide for stiffening said body and for loosening said members to provide for the movement of some of the elements of the figure, and a spring acting on said actuating device normally tending to tighten said connecting members for normally maintaining said figure in the erect position.

5. In a toy representing a figure having movable parts, a base on which the figure is mounted, a plurality of articulated, abutting elements forming said figure, flexible connecting members passing through said elements, a tiltable actuating device connected to said connecting members for tightening said members to provide for stiffening said figure and for reducing the tension of some of said members to allow movement of some of the elements of the figure, and a spring acting on said actuating device normally tending to tighten said connecting members for normally maintaining said figure in the erect position.

6. A toy simulating an animate figure comprising, a base on which the figure is supported, said figure being composed of a plurality of relatively movable respectively abutting parts, some of said parts having openings formed therein, an actuating member, a tension-transmitting member fixedly connected at one end to the actuating member and at the other end to a relatively remote part of the figure and passing through the openings in figure parts located between said remote part and the actuating member, elastic means engaging and pressing the actuating member in a direction to apply tension in the tension-transmitting member to cause the figure to assume an erect position, said actuating member being located exteriorly of the figure and accessible for manipulation against the urge of the elastic tension-applying means for reducing the tension in the tension-transmitting member so as to provide relative movement of the parts.

7. A toy comprising a body simulating an animate figure, a base on which the body is mounted, said body being composed of a plurality of relatively movable parts successively abutting one another, some of said parts having openings formed therein, a plurality of tension-transmitting members each secured at one end to a body part relatively remote from the base and extending toward the base within the openings of some of the parts having openings, said tension-transmitting members reaching the base at points spaced apart, actuating means mounted pivotally with respect to the base and including one member having its inner end provided with an opening through which the tension-transmitting members pass, said inner end of the actuating member being normally disposed centrally of the points where the respective tension-transmitting members reach the base, whereby pivotal shifting of the actuating member increases the tension in some tension-transmitting members and relaxes the tension in others and causes relative movement of the various body parts, said actuating means also including a tension-applying member shiftable relative to the first-mentioned member of the actuating means and to which the tension-transmitting members are secured at their other ends, and elastic means interposed between and engaging the two members of the actuating means for applying tension in the tension-transmitting members to normally maintain the body erect, the tension-applying member being located accessible for manipulation to be shifted to overcome the elastic means and relax the tension in all of the transmitting members and permit the body to collapse.

8. In a toy representing the body of a legged mock animal figure provided with a tail, strand-like tension-transmitting members engaging in two different pairs with one of their ends with the head and the tail of said animal respectively and being secured at their other ends at correlated positions on an actuating plate for said head and said tail, said head, said tail, the body part and the legs of said animal having openings formed therein for said tension-transmitting members to pass through from said engaging portions towards said plate, said pairs of tension-transmitting members extending from said head through the front legs and from said tail through the hind legs to said different positions of said plate respectively, a base on which the figure is mounted, said plate being urged away from said base by means of a spring arranged to influence said actuating plate for tensioning said tension-transmitting members, said actuating plate being accessible for manipulation to be selectively tilted or wholly depressed against the action of said spring for correspondingly relaxing or tensioning the respective tension-transmitting members and effecting consequent movements of corresponding body parts.

9. In a toy representing the body of an animate being, a base having an upper surface on which the body is supported, said body having a series of successively abutting parts at least some of which are movable, some of said parts being provided with openings, tension-transmitting members each engaging with one of its ends with a movable body part relatively remote from the base, an actuating plate situated beneath the surface of the base on which the body is supported, said tension-transmitting members being secured at their other ends to said actuating plate and extending intermediate of their ends through the openings in some of the body parts, elastic means engaging and pressing said plate in a direction to apply tension in said tension-transmitting members to normally maintain the body in a predetermined position, said actuating plate being located so as to be accessible to an operator's hands whereby the plate may be variously shifted against the action of the elastic means so as to vary the tension in the tension-transmitting members and cause various movements of the body parts.

10. In a toy simulating the body of an animate living being having at least one movable part and other parts, a base member provided with an upper side on which the body stands, tension-transmitting members secured at one of their ends to said movable part and secured at their other ends to an actuating plate, said actuating plate being arranged in a side of said base member, some of said body parts having openings formed therein and accommodating in said openings said tension-transmitting members extending from their ends secured to the body part through adjoining parts of said body to said actuating plate, elastic means pressing the actuating plate in a direction to provide tension in said tension-transmitting means, said actuating plate being manually shiftable against the pressure of said elastic means in various directions for correspondingly tensioning and relaxing said tension-transmitting members respectively for causing said movable parts to effect consequent movements in various directions and to different extents relative to other body parts in response to the shifting of the actuating plate.

11. A toy simulating a movable object comprising, a base, a plurality of articulated parts arranged in successively abutting relation to each other and being supported on said base, some of said articulated parts having a plurality of openings extending through said parts in spaced relation to each other, a plurality of tension-transmitting members extending through said openings respectively and being secured at one of their ends to an articulated part, an actuating member movably connected with the base, said tension-transmitting members being connected at their other ends to said actuating member, and elastic means pressing said actuating member in a direction to apply tension in the tension-transmitting members, whereby movements of the actuating member alters the tension in the respective tension-transmitting members and causes movements of the articulated parts through which said tension-transmitting members extend.

MEINRAD MARTY.

REFERENCES CITED

The following references are of record in the file of this patent:

UNITED STATES PATENTS

| Number | Name | Date |
|---|---|---|
| 1,601,983 | Savage | Oct. 5, 1926 |